(12) United States Patent
Ice

(10) Patent No.: US 7,547,149 B2
(45) Date of Patent: Jun. 16, 2009

(54) OPTICAL CONNECTOR LATCH ASSEMBLY FOR AN OPTOELECTRONIC MODULE

(75) Inventor: Donald A. Ice, Milpitas, CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 11/693,681

(22) Filed: Mar. 29, 2007

(65) Prior Publication Data

US 2008/0145003 A1    Jun. 19, 2008

Related U.S. Application Data

(60) Provisional application No. 60/870,806, filed on Dec. 19, 2006, provisional application No. 60/870,807, filed on Dec. 19, 2006.

(51) Int. Cl.
*G02B 6/36* (2006.01)

(52) U.S. Cl. .................. 385/88; 385/89; 385/92; 385/139

(58) Field of Classification Search ........... 385/88–94, 385/139
See application file for complete search history.

(56) References Cited

U.S. PATENT DOCUMENTS

| 4,911,519 | A | 3/1990 | Burton et al. |
|---|---|---|---|
| 6,302,596 | B1 | 10/2001 | Cohen et al. |
| 6,494,736 | B2 | 12/2002 | Mito |
| 6,652,158 | B2 | 11/2003 | Bartur et al. |
| 6,712,527 | B1 | 3/2004 | Chan et al. |
| 6,749,448 | B2 * | 6/2004 | Bright et al. ............ 439/160 |
| 7,300,215 | B2 * | 11/2007 | Hsiao et al. ............. 385/92 |
| 2002/0136501 | A1 | 9/2002 | Yen et al. |
| 2003/0020998 | A1 | 1/2003 | Kuczynski |
| 2003/0072540 | A1 | 4/2003 | Huang |
| 2003/0185525 | A1 | 10/2003 | Lacy et al. |
| 2004/0264887 | A1 | 12/2004 | Rosenberg et al. |
| 2006/0093281 | A1 | 5/2006 | Kesler |
| 2006/0281357 | A1 | 12/2006 | Chen et al. |

FOREIGN PATENT DOCUMENTS

| JP | 16012672 | 1/2004 |
|---|---|---|
| JP | 17275407 | 10/2005 |
| JP | 18106751 | 4/2006 |
| JP | 18106752 | 4/2006 |

(Continued)

OTHER PUBLICATIONS

U.S. Appl. No. 11/960,530, filed Apr. 3, 2008, Office Action.

(Continued)

*Primary Examiner*—Sung H Pak
*Assistant Examiner*—Daniel Petkovsek
(74) *Attorney, Agent, or Firm*—Workman Nydegger

(57) ABSTRACT

An optical connector latch assembly for an optoelectronic module that can releasably engage an optical fiber connector that is received in a receptacle of the optoelectronic module. In one example embodiment, an optical connector latch arm includes a base, a shaft extending from the base, and a hook extending from the shaft. In this example embodiment, the base defines a complementary structure that is configured to engage a complementary structure of an OSA connector block. Also, the hook is configured to releasably engage an optical fiber connector.

13 Claims, 9 Drawing Sheets

FOREIGN PATENT DOCUMENTS

| | | |
|---|---|---|
| JP | 18108684 | 4/2006 |
| JP | 18259731 | 9/2006 |

OTHER PUBLICATIONS

U.S. Appl. No. 11/960,530, filed Dec. 19, 2008, Donald A. Ice.

U.S. Appl. No. 11/960,550, filed Dec. 19, 2008, Donald A. Ice.

U.S. Appl. No. 11/693,687, filed Jan. 24, 2008, Office Action.

U.S. Appl. No. 11/693,674, filed Feb. 21, 2008, Office Action.

Ice, Donald A., Electromagnetic Interference Shield for an Optoelectronic Module, U.S. Appl. No. 11/693,679, filed Mar. 29, 2007.

Ice, Donald A., Optical Subassembly Connector Block for an Optoelectronic Module, U.S. Appl. No. 11/693,674, filed Mar. 29, 2007.

Ice, Donald A., Latch Assembly for an Optoelectronic Module, U.S. Appl. No. 11/693,687, filed Mar. 29, 2007.

Ice, Donald A., Connectorized Optical Subassembly Block for Use with a Communications Module, U.S. Appl. No. 60/870,806, filed Dec. 19, 2006.

Ice, Donald A., EMI Shield for Placement between an Optical Subassembly and a Connector Block in a Communications Module, U.S. Appl. No. 60/870,807, filed Dec. 19, 2006.

U.S. Appl. No 11/960,550, filed Aug. 6, 2008, Non-Final Office Action.

U.S. Appl. No. 11/693,674, filed Sep. 10, 2008, Final Office Action

* cited by examiner

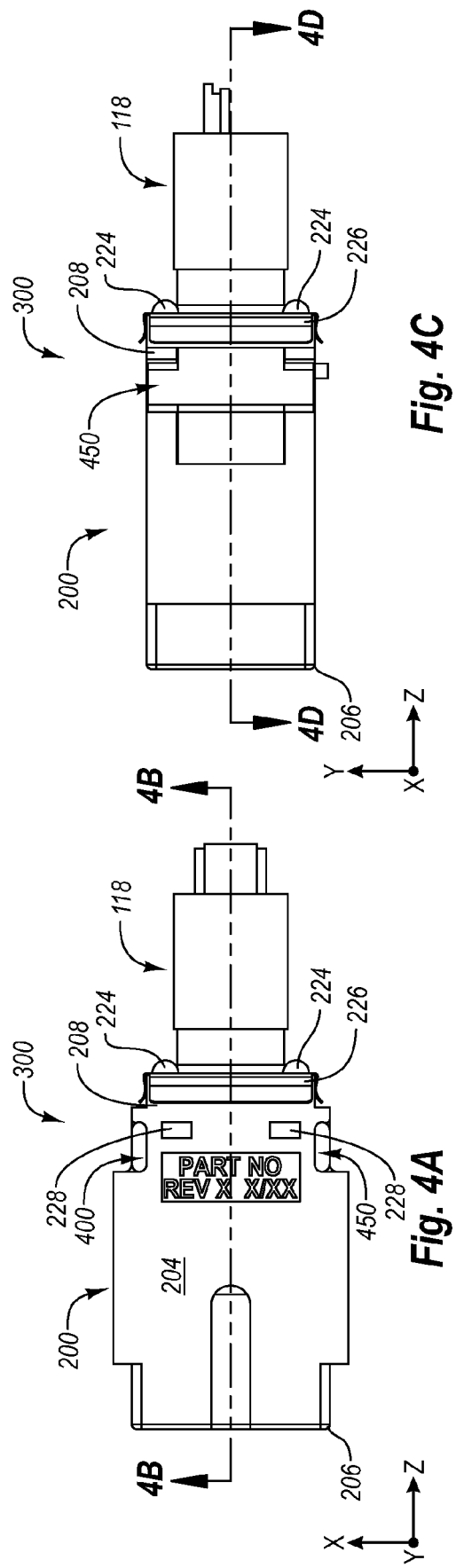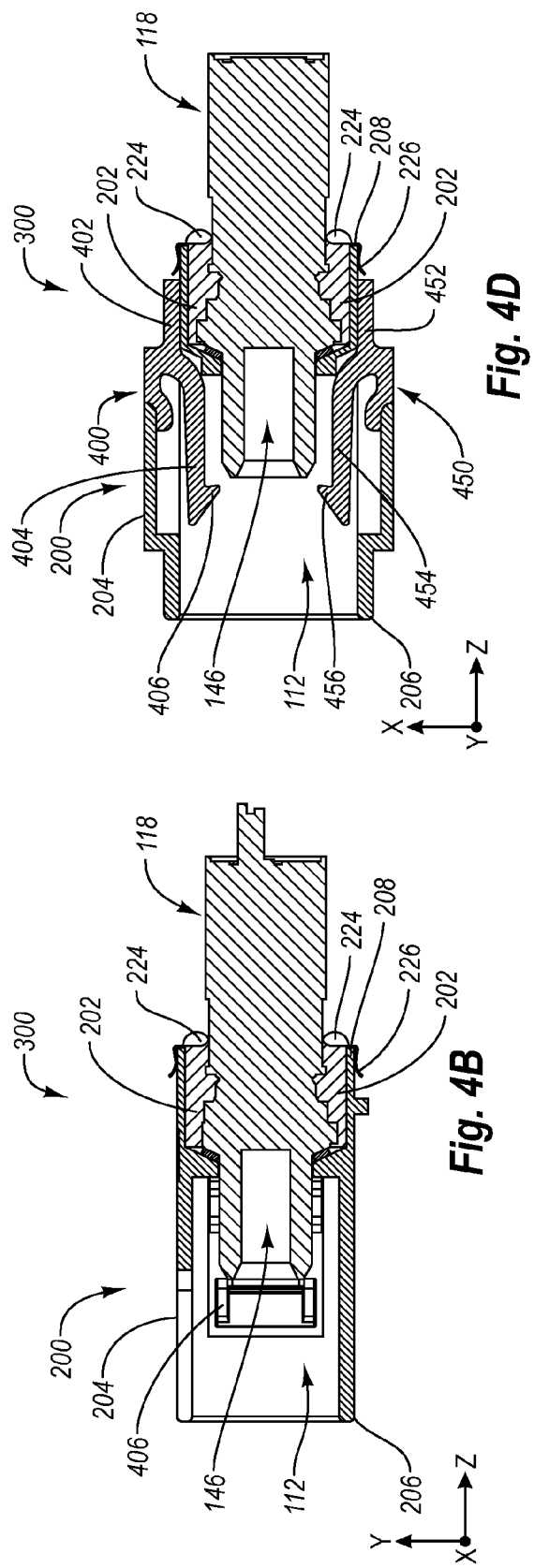

US 7,547,149 B2

OPTICAL CONNECTOR LATCH ASSEMBLY FOR AN OPTOELECTRONIC MODULE

CROSS-REFERENCE TO RELATED APPLICATIONS

This application claims priority to U.S. Provisional Patent Application Ser. No. 60/870,806, filed on Dec. 19, 2006 and U.S. Provisional Patent Application Ser. No. 60/870,807, filed on Dec. 19, 2006, each of which is incorporated herein by reference in its entirety.

BACKGROUND

Optoelectronic modules, such as optoelectronic transceiver or transponder modules, are increasingly used in optoelectronic communication. An optoelectronic module, such as an optoelectronic transponder module, includes various components that are necessary to enable optical data transmission and reception. The components are housed within a housing of the optoelectronic module. Examples of such internal components include a printed circuit board ("PCB"), a transmitter optical subassembly ("TOSA") and a receiver optical subassembly ("ROSA"). The optoelectronic module itself is configured to be received within a host device that serves as one component of a communications network.

In order to enable optical communication with other optoelectronic modules and devices in a communications network, an optoelectronic module is configured to connect with one or more optical fibers. To enable such connection, the optoelectronic module includes both a transmit receptacle and receive receptacle that are each configured to receive an optical fiber connector. Typically, these receptacles are defined in the housing of the optoelectronic module. Though functional, this design brings with it some challenges including alignment issues between nose pieces of the TOSA/ROSA and the respective optical fiber connectors, hard plug issues, and wiggle performance concerns.

As discussed above, an optoelectronic module also often includes one or more PCBs with electronic circuitry. The electronic circuitry of a PCB can create electromagnetic interference. Electromagnetic interference ("EMI") is caused by electromagnetic radiation that can be emitted by electrical circuits carrying rapidly changing signals. Electromagnetic radiation is produced as a by-product of the normal operation of the electrical circuitry of a PCB in an optoelectronic module. The emission of electromagnetic radiation from an optoelectronic module can cause unwanted EMI to be induced in nearby electronic devices. The emission of EMI-causing electromagnetic radiation from an optoelectronic module can thus interrupt, obstruct, or otherwise degrade or limit the effective performance of surrounding electronic devices.

Concerns over the emission of electromagnetic radiation may also influence the configuration of other components within an optoelectronic module. For example, some optoelectronic modules include an optical connector latch assembly that is formed from an electrically conductive material in order to help control the emission of electromagnetic radiation. Forming an optical connector latch assembly from an electrically conductive material can, in some instances, compromise the mechanical performance of the optical connector latch assembly, especially where a substantially non-conductive material, such as plastic, would exhibit better mechanical performance.

Other optoelectronic modules include an optical connector latch assembly that is initially formed from a substantially non-conductive material, but is subsequently coated with a conductive material. Although optical connector latch assemblies that are coated with a conductive material may initially be effective in helping to control the emission of electromagnetic radiation, the repeated mechanical strains that the optical connector latch assemblies are subjected to during normal plugging and unplugging of optical fiber connectors can cause the coating of conductive material to rub off or flake off, thus contaminating the optical connector and compromising the effectiveness of the optical connector latch assemblies in controlling the emission of electromagnetic radiation.

Another common difficulty with optical connector latch assemblies is monolithic construction. A typical optical connector latch assembly includes a pair of latch arms that are each configured to interact independently with an optical fiber connector. Where the latch arms are part of a monolithic component, independent interaction with an optical fiber connector can cause one or more connecting points between the latch arms to flex undesirably. This flexing can degrade the effectiveness of the optical connector latch assembly.

SUMMARY OF SOME EXAMPLE EMBODIMENTS

In general, example embodiments of the invention relate to optoelectronic modules and, in particular, to an optical connector latch assembly for an optoelectronic module. The example optical connector latch assembly can releasably engage an optical fiber connector that is received in a receptacle of the optoelectronic module.

In one example embodiment, an optical connector latch arm includes a base, a shaft extending from the base, and a hook extending from the shaft. In this example embodiment, the base defines a complementary structure that is configured to engage a corresponding complementary structure of an OSA connector block. Also, the hook is configured to releasably engage an optical fiber connector.

In another example embodiment, an OSA connector block assembly includes an OSA connector block and an optical connector latch assembly attached to the OSA connector block. The OSA connector block includes a monolithic body having first and second ends. The first end defines a receptacle that is configured to receive at least a portion of an optical fiber connector. The second end defines a cavity that is configured to receive at least a portion of an OSA. The optical connector latch assembly includes two separate optical connector latch arms. Each optical connector latch arm includes a base attached to the monolithic body of the OSA connector block, a shaft extending from the base, and a hook extending from the shaft. The hook is at least partially disposed in the receptacle and configured to releasably engage an optical fiber connector.

In yet another example embodiment, an optoelectronic module includes an electrically conductive housing, a transmitter OSA and a receiver OSA at least partially situated within the housing, a PCB at least partially situated within the housing and in electrical communication with the transmitter OSA and the receiver OSA, and a pair of OSA connector blocks at least partially situated within the housing, and an optical connector latch assembly attached to each OSA connector block. Each of the OSA connector block corresponds to one of the OSAs and includes a monolithic body having first and second ends. The first end defines a receptacle that is configured to receive at least a portion of an optical fiber connector. The second end defining a cavity in which at least a portion of the corresponding OSA is situated. Each optical connector latch assembly includes two separate optical connector latch arms. Each optical connector latch arm includes a base attached to the monolithic body of the OSA connector block, a shaft extending from the base, and a hook extending from the shaft. Each hook is at least partially disposed in the receptacle and is configured to releasably engage an optical fiber connector.

These and other aspects of example embodiments of the present invention will become more fully apparent from the following description and appended claims.

BRIEF DESCRIPTION OF THE DRAWINGS

To further clarify the above and other aspects of example embodiments of the present invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention nor are they necessarily drawn to scale. Example embodiments of the invention will be disclosed and explained with additional specificity and detail through the use of the accompanying drawings in which:

FIGS. 4A-4D are directed to various views of the OSA connector assembly of FIGS. 3A and 3B.

DETAILED DESCRIPTION OF EXAMPLE EMBODIMENTS

Figure 1A:
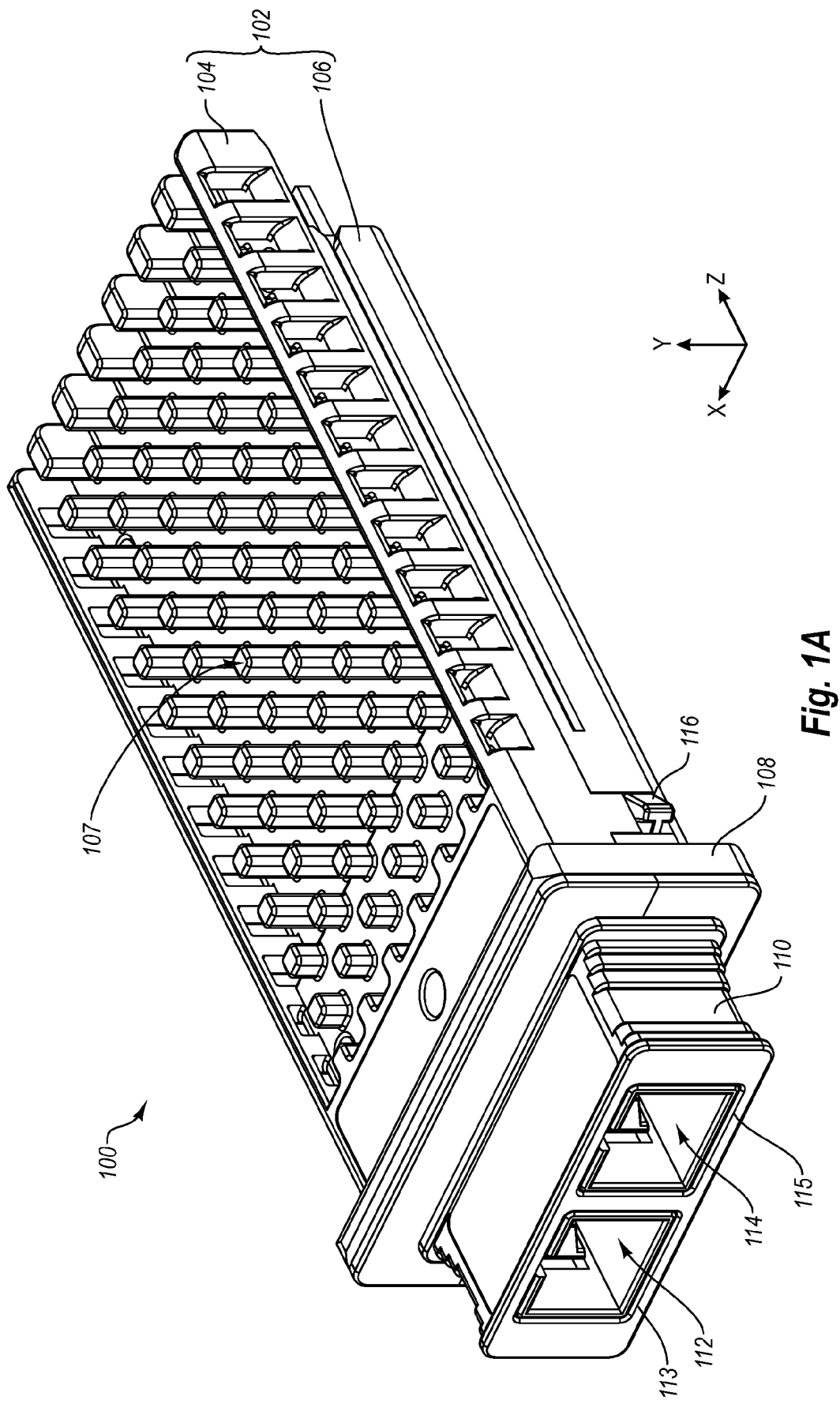
FIG. 1A discloses an example optoelectronic module.

As noted above, example embodiments of the invention relate to an optical connector latch assembly for an optoelectronic module. The example optical connector latch assembly can releasably engage an optical fiber connector that is received in a receptacle of the optoelectronic module.

1. Example Optoelectronic Module

Reference is first made to FIGS. 1A-1D, which disclose various aspects of an example optoelectronic module 100 for use in transmitting and receiving optical signals in connection with a host device (not shown). As disclosed in FIG. 1A, the optoelectronic module 100 includes various components, including a housing 102 that includes a cover 104 and a shell 106. The cover 104 includes a heat sink 107. The heat sink 107 functions to dissipate heat generated within the optoelectronic module 100. The cover 104 and the shell 106 can be formed using a die casting process. One example material from which the cover 104 and the shell 106 can be die cast is a zinc alloy, although the cover 104 and the shell 106 may alternatively be die cast, or otherwise constructed, from other suitable materials.

Figure 1B:
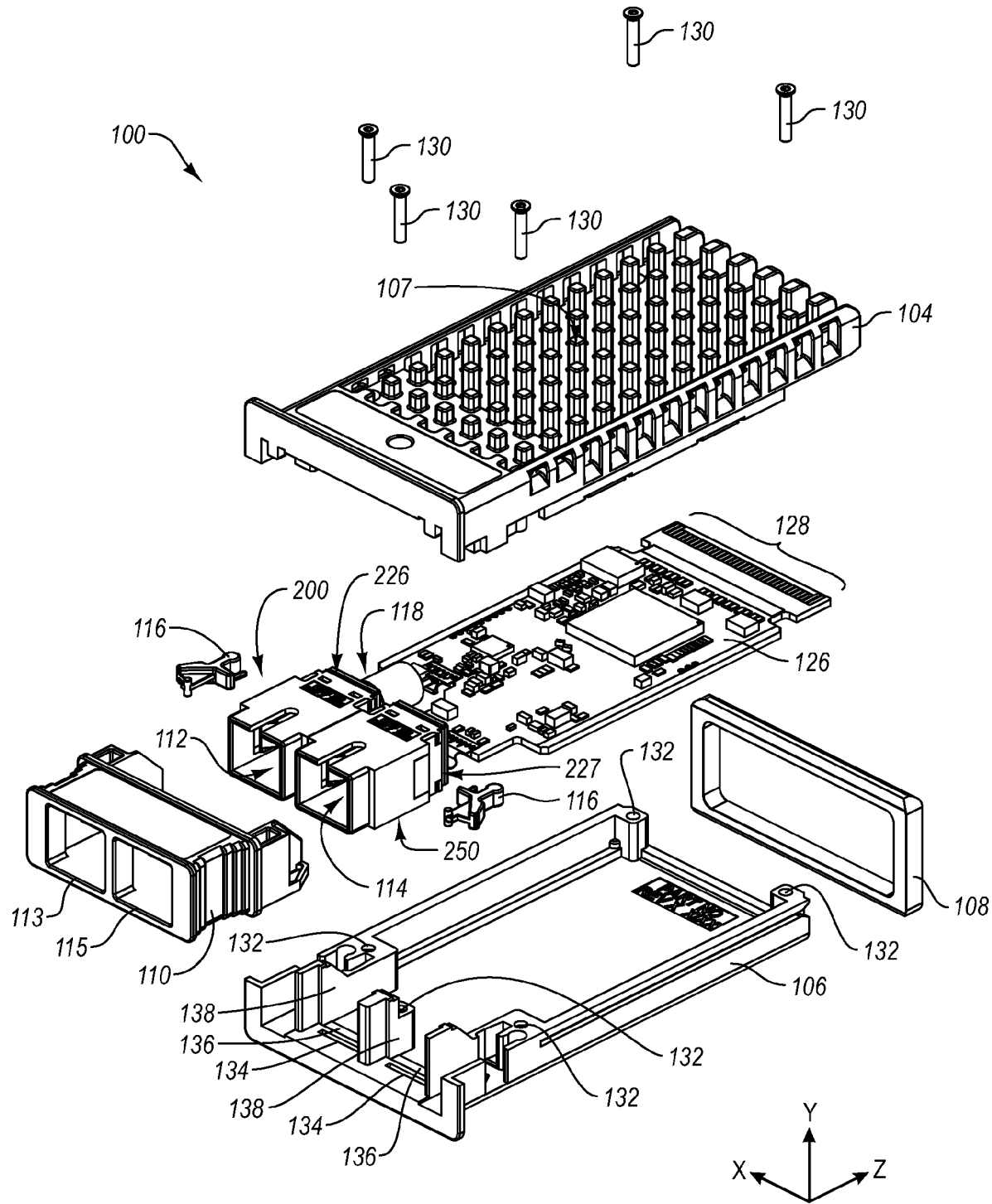
FIG. 1B is an exploded perspective view of the optoelectronic module of FIG. 1A including an example OSA connector block and an example TOSA.

As disclosed in FIGS. 1A and 1B, the example optoelectronic module 100 also includes an EMI gasket 108 that encircles the cover 104 and the shell 106, a de-latch sleeve 110 connected to the cover 104 and the shell 106, a transmit receptacle 112 and a receive receptacle 114 that can be accessed, respectively, through openings 113 and 115 defined in the de-latch sleeve 110, and a pair of latches 116 that are mechanically connected to the de-latch sleeve 110. Each of the receptacles 112 and 114 are configured to receive an optical fiber connector (not shown). The receptacles 112 and 114 can each be configured to receive an optical fiber connector having one of various configurations including, but not limited to, an SC optical fiber connector. The de-latch sleeve 110 can be employed to disengage the latches 116 from a host device (not shown). Additional details regarding the structure and function of example embodiments of a de-latch sleeve and a corresponding pair of latches can be found in co-pending U.S. patent application Ser. No. 11/693,687, titled "LATCH ASSEMBLY FOR AN OPTOELECTRONIC MODULE," which is filed concurrently herewith and incorporated herein by reference in its entirety.

Figure 1C:
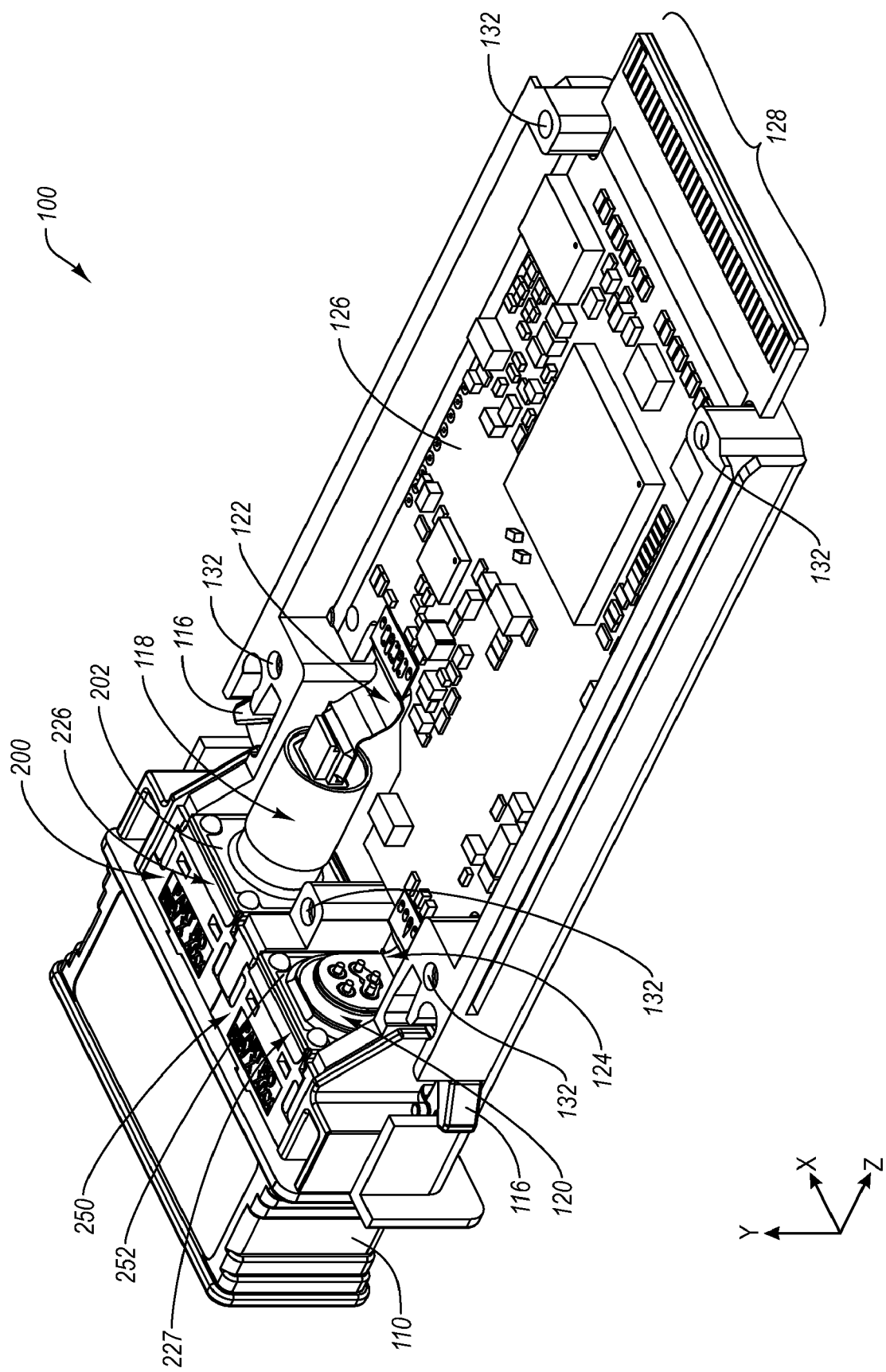
FIG. 1C is a partial rear perspective view of the optoelectronic module of FIG. 1A, with the cover removed, the optoelectronic module including the example OSA connector block and the example TOSA of FIG. 1B.

As disclosed in FIGS. 1B and 1C, the example optoelectronic module 100 further includes a transmitter OSA ("TOSA") 118, a receiver OSA ("ROSA") 120, and two substantially identical OSA connector blocks 200 and 250 within which the TOSA 118 and the ROSA 120, respectively, are partially positioned. The TOSA 118 and the ROSA 120 are held in place within the OSA connector blocks 200 and 250 by adhesives 202 and 252, respectively. It is noted that as the TOSA 118 and the ROSA 120 may have different form factors, the adhesives 202 and 252 may have different sizes, shapes, and/or volumes that correspond to the different form factors, respectively, to securely and permanently connect the TOSA 118 and the ROSA 120 to the OSA connector blocks 200 and 250.

The example optoelectronic module 100 also includes electrical interfaces 122 and 124 and a printed circuit board ("PCB") 126 having an edge connector 128. The two electrical interfaces 122 and 124 are used to electrically connect the TOSA 118 and the ROSA 120, respectively, to the PCB 126. The edge connector 128 can be used to electrically connect the PCB 126 with a host device (not shown).

Figure 1D:
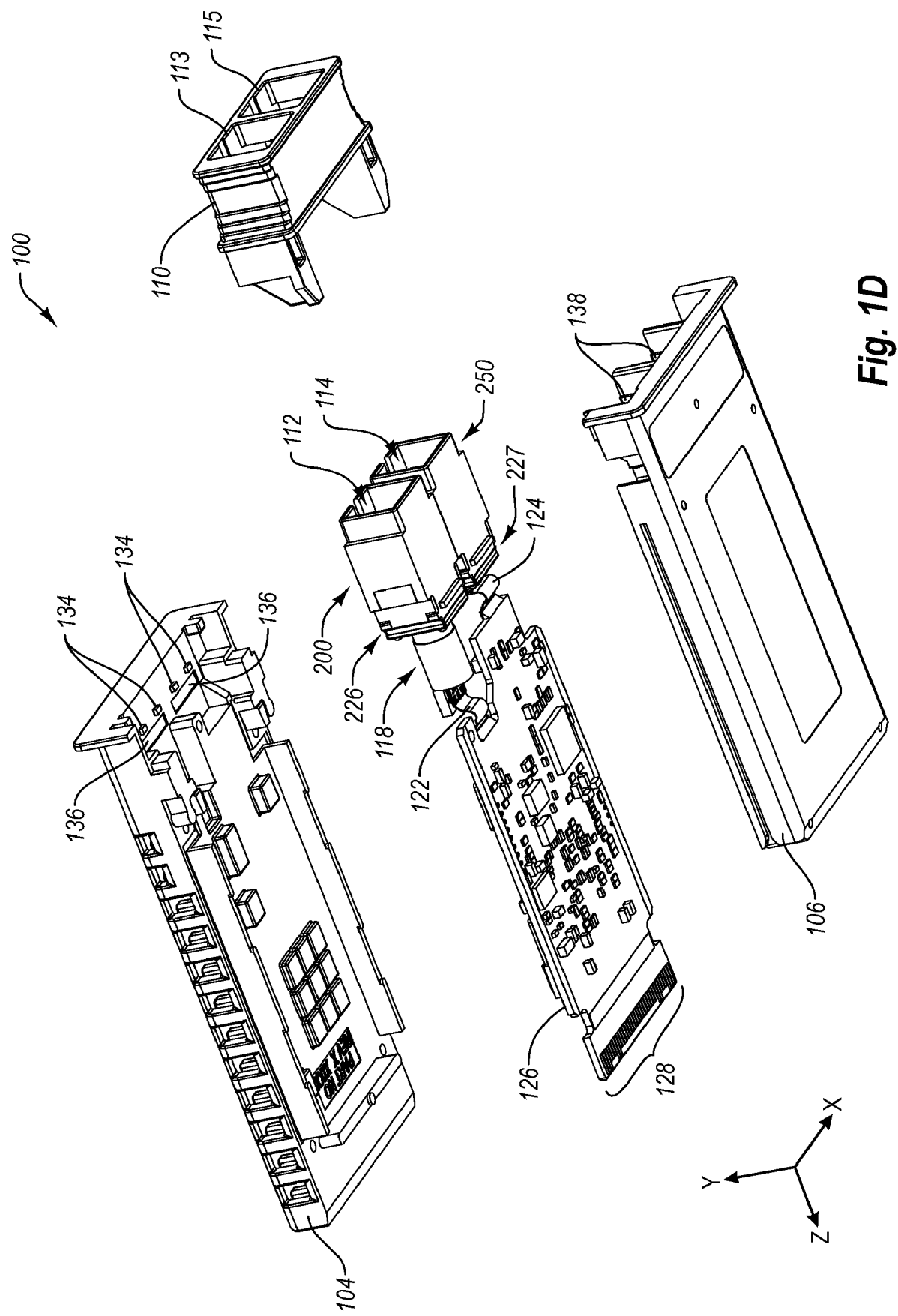
FIG. 1D is a bottom exploded perspective view of portions of the optoelectronic module of FIG. 1A including an example OSA connector block and an example TOSA.

With continuing reference to FIGS. 1B-1D, the cover 104 and the shell 106 of the housing 102 can be connected to each other using fasteners 130. The fasteners 130 are configured to pass through the cover 104 and engage holes 132 in the shell 106. As disclosed in FIGS. 1B and 1D, the cover 104 and the shell 106 of the housing 102 also includes various structures 134 that are each configured to engage complementary structures (not shown; see FIG. 2A) formed on one of the OSA connector blocks 200 or 250, as discussed in greater detail below. As disclosed in FIGS. 1B and 1D, the cover 104 and the shell 106 of the housing 102 further include indentations 136 and sidewalls 138 which are each sized and configured to engage one of the EMI shields 226 or 227. This engagement between the EMI shields 226 and 227 and the housing 102 creates a reliable electrical communication between the EMI shields 226 and 227 and the housing 102.

The optoelectronic module 100 can be configured for optical signal transmission and reception at a variety of per-second data rates including, but not limited to, 1 Gbit, 2 Gbit, 2.5 Gbit, 4 Gbit, 8 Gbit, 10 Gbit, 10.3 Gbit, 10.5 Gbit, or higher. Further, the optoelectronic module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Also, the optoelectronic module 100 can be configured to support various communication protocols including, but not limited to, Fast Ethernet, Gigabit Ethernet, 10 Gigabit Ethernet, and 1×, 2×, 4×, and 10× Fibre Channel. Further, the optoelectronic module 100 can be configured to operate at various temperature ranges including, but not limited to, 0° C. to 70° C. In addition, although one example of the optoelectronic module 100 is an optoelectronic transponder module configured to have a form factor that is substantially compliant with the X2 Multi-Source Agreement ("X2 MSA"), and is thus referred to as an X2 transponder module, the optoelectronic module 100 can alternatively be configured to have a variety of different form factors that are substantially compliant with other transceiver and/or transponder MSAs including, but not limited to, SFF, SFP, or XFP.

2. Example OSA Connector Block and Example TOSA

Figure 2A:
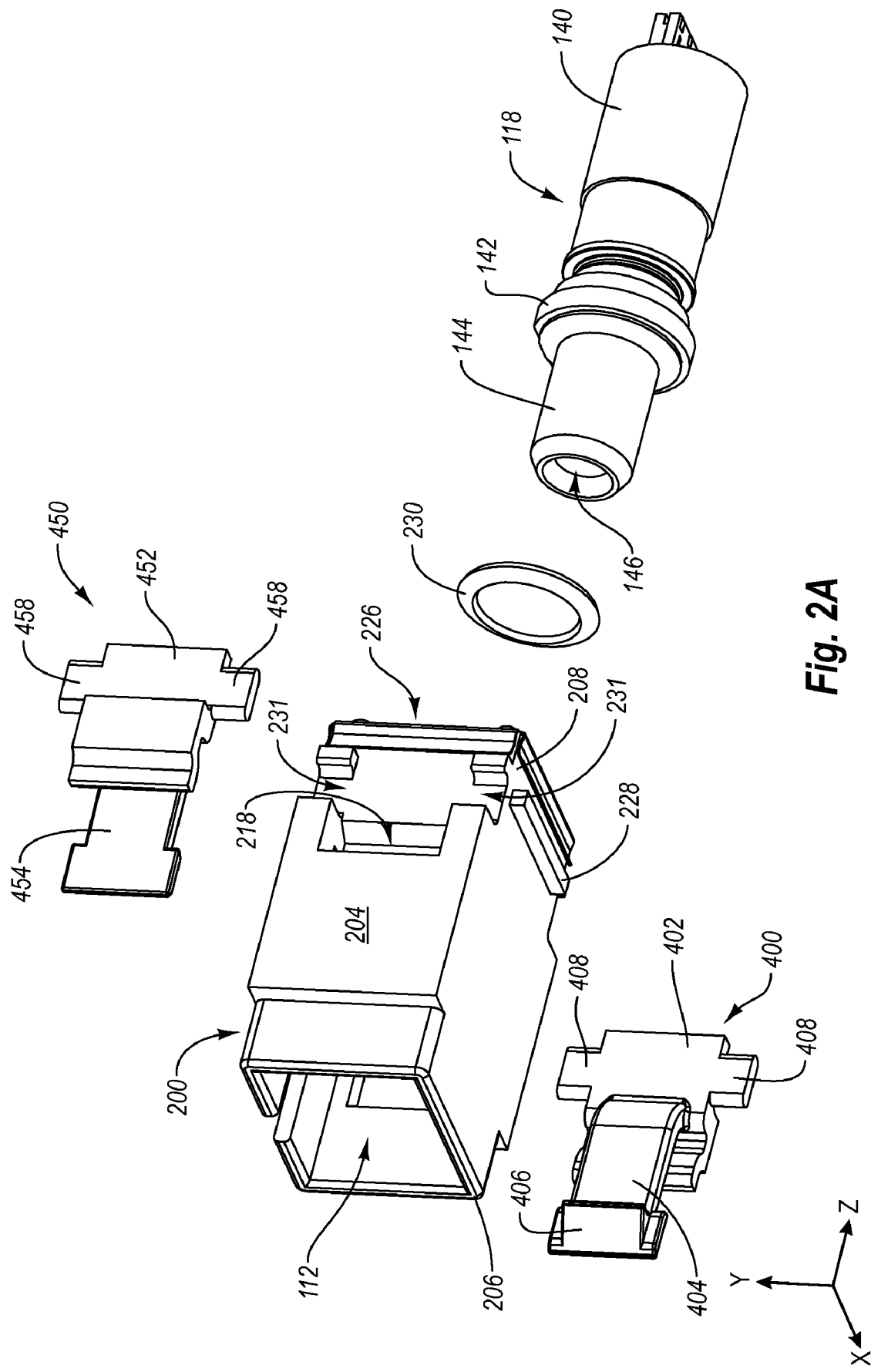
FIG. 2A is an exploded front perspective view of the OSA connector block and the TOSA of FIGS. 1B-1D.
Figure 2B:
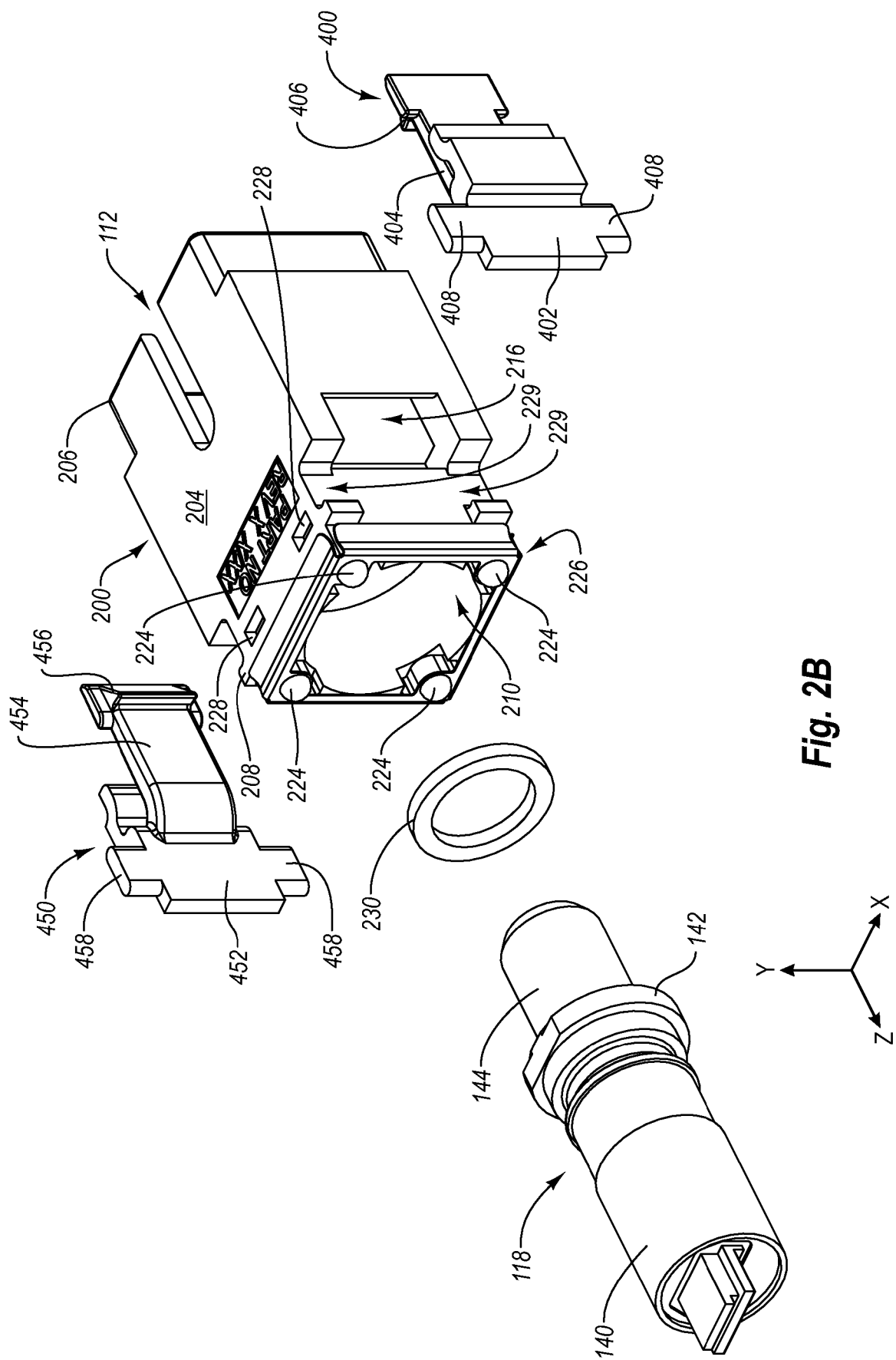
FIG. 2B is an exploded rear perspective view of the OSA connector block with the EMI shield of FIG. 2A.
Figure 3A:
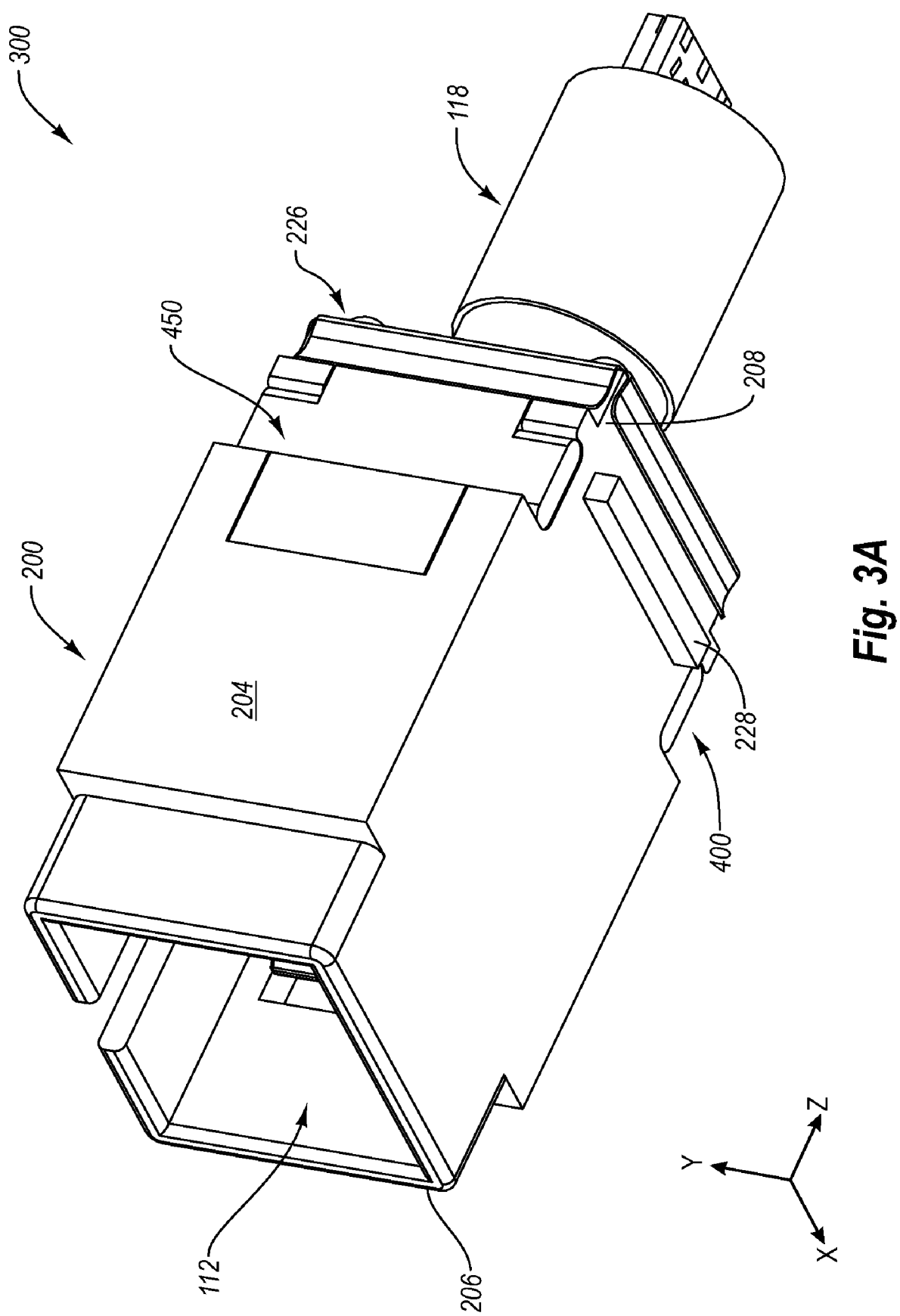
FIG. 3A is a front perspective view of the OSA connector block and the TOSA of FIGS. 2A and 2B assembled into an example OSA connector assembly.
Figure 3B:
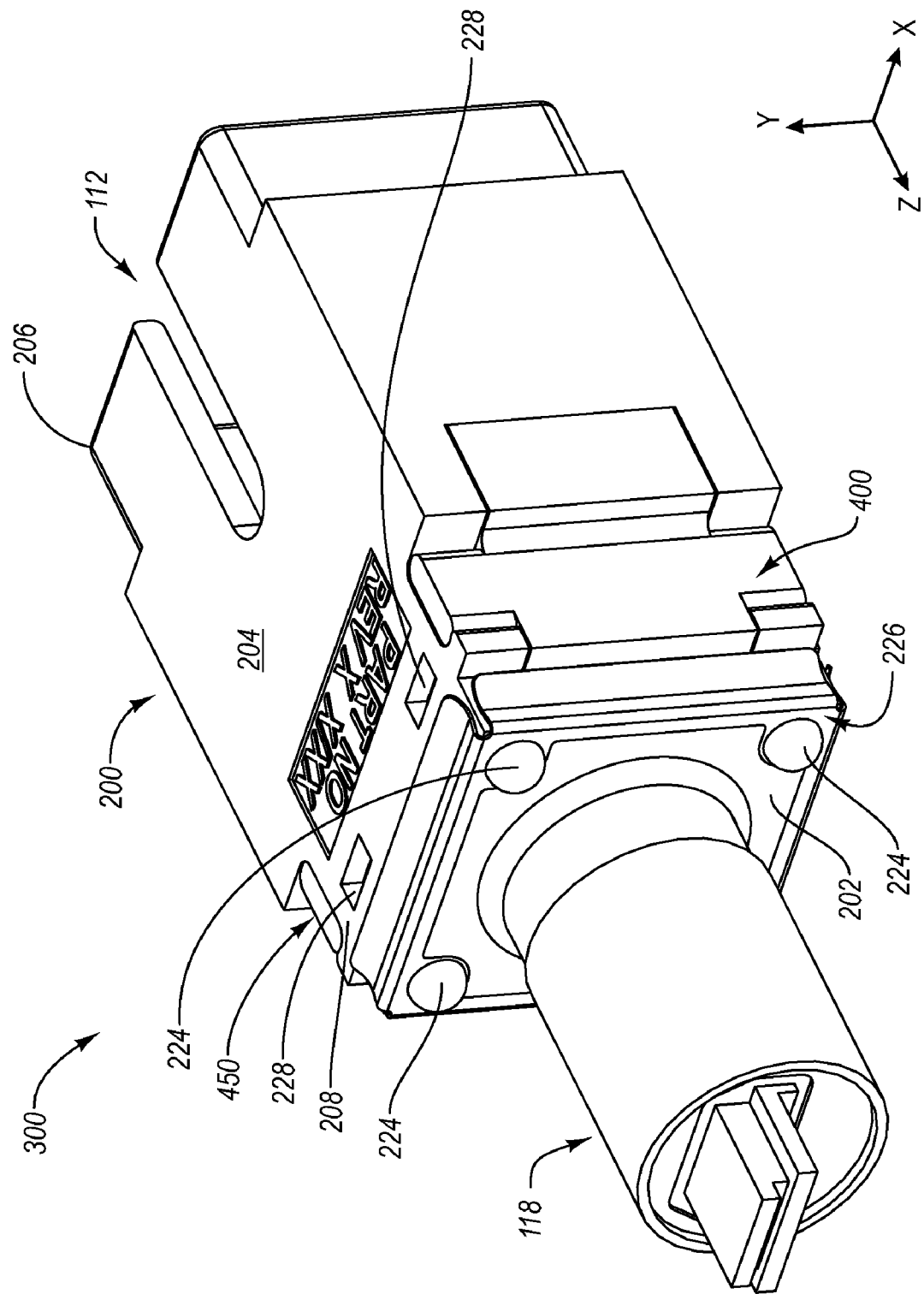
FIG. 3B is a rear perspective view of the example OSA connector assembly of FIG. 3A.

With continuing reference to FIGS. 1B and 1C, and with reference now to FIGS. 2A and 2B, aspects of the example OSA connector block 200 and the example TOSA 118 are disclosed. It is noted that, since the OSA connector blocks 200 and 250 are substantially identical in this example, only the OSA connector block 200 will be described in detail here. Nevertheless, the aspects disclosed herein can be generally applied to both of the OSA connector blocks 200 and 250.

As disclosed in FIG. 1C, the TOSA 118 and the ROSA 120, respectively received in the OSA connector blocks 200 and 250, have different form factors. However, the substantially identical OSA connector blocks 200 and 250 are specifically sized and configured to accommodate OSAs having various different form factors, such as the TOSA 118 and the ROSA 120. This accommodation of different OSAs having various different form factors is accomplished by connecting the different OSAs to the substantially identical OSA connector blocks using different sizes, shapes, and/or volumes of adhesive, as discussed in greater detail below.

With continued reference to FIGS. 1B, 1C, 2A, and 2B, the TOSA 118 includes a barrel 140 within which an optical transmitter, such as a laser, (not shown) is positioned. The optical transmitter is configured to convert electrical signals received through the PCB 126 from a host device (not shown) into corresponding optical signals. The TOSA 118 also includes a flange 142 and a nose piece 144. The nose piece 144 defines a port 146. The port 146 is configured to optically connect the optical transmitter positioned within the barrel 140 with the fiber-ferrule portion of an optical fiber connector (not shown) received within the transmit receptacle 112.

Similarly, the ROSA 120 of the optoelectronic module 100, as disclosed in FIG. 1C, includes a barrel, a flange, and a nose piece (not shown) similar to the barrel 140, flange 142 and nose piece 144 of the TOSA 118. The nose piece of the ROSA 120 defines a port (not shown) similar to the port 146. The port is configured to optically connect an optical receiver, such as a photodiode (not shown), positioned within the barrel to a fiber-ferrule portion of an optical fiber connector (not shown) received within the receive receptacle 114. The optical receiver is configured to convert optical signals received from the fiber-ferrule portion of the optical fiber connector into corresponding electrical signals for transmission to a host device (not shown) through the PCB 126.

It is noted that although the outside form factors of the respective barrels, flanges, and/or nose pieces of the TOSA 118 and the ROSA 120 may differ, the general interface between these OSA components and the OSA connector blocks 200 and 250 is similar, and only the interface between the TOSA 118 and the OSA connector block 200 will be described in detail here. Nevertheless, the aspects disclosed herein can be generally applied to the ROSA 120 and the OSA connector block 250.

With continued reference to FIGS. 2A and 2B, the example OSA connector block 200 includes a body 204. In one example embodiment, the body 204 of the OSA connector block 200 can be a substantially monolithic component. For example, the body 204 of the OSA connector block 200 can be a monolithic die-cast component, although processes other than die-casting may be employed to produce a monolithic OSA connector block 200. The body 204 of the OSA connector block 200 may be formed from a metal, such as a zinc alloy or other suitable material.

The body 204 of the OSA connector block 200 includes a first end 206 defining the transmit receptacle 112. The transmit receptacle 112 can be configured to releasably receive at least a portion of an optical fiber connector (not shown), such as an SC optical fiber connector. The body 204 of the OSA connector block 200 also includes a second end 208 defining a cavity 210. The cavity 210 can be configured to permanently receive at least a portion of an OSA, such as the TOSA 118. The body 204 of the OSA connector block 200 may further define a pair of openings 216 and 218. The opening 216 is configured to receive at least a portion of an optical connector latch arm 400 and the opening 218 is configured to receive at least a portion of an optical connector latch arm 450, as discussed in greater detail below.

The body 204 of the OSA connector block 200 may also include a plurality of posts 224 extending from the body 204. Each of the posts 224 is configured to engage a corresponding mounting hole (not shown) of the EMI shield 226 in order to attach the EMI shield 226 to the body 204 of the OSA connector block 200. As disclosed in the Figures, each of the posts 224 may be swaged after the EMI shield 226 is attached to the body 204 of the OSA connector block 200. Swaging the posts 224 can permanently attach the EMI shield 226 to the body 204. Additional details regarding the structure and function of example embodiments of the EMI shield 226 can be found in co-pending U.S. patent application Ser. No. 11/693,679, titled "EMI SHIELD FOR AN OPTOELECTRONIC MODULE," which is filed concurrently herewith and incorporated herein by reference in its entirety.

As disclosed in FIGS. 1B, 1D, 2A, and 2B, the body 204 of the OSA connector block 200 may further include a first set of complementary structures 228 that corresponds to a second set of complementary structures 134 defined in the cover 104 and the shell 106 of the housing 102. More specifically, the first set of complementary structures 228 and the second set of complementary structures 134 are configured to engage each other during assembly of the optoelectronic module 100 in order to appropriately position the OSA connector block 200, and the EMI shield 300, with respect to the cover 104 and the shell 106 of the housing 102. It is noted that other complementary structures having different sizes, configurations, shapes, orientations, and positions could alternatively be employed, and the scope of the invention is not limited to the specific sizes, configurations, shapes, orientations, and positions disclosed in FIGS. 1B, 1D, 2A, and 2B.

3. Example Optical Connector Latch Assembly

With continuing reference to FIGS. 2A and 2B, aspects of an example optical connector latch assembly are disclosed. The optical connector latch assembly includes two optical connector latch arms 400 and 450. In the example embodiment disclosed in FIGS. 2A and 2B, the optical connector latch arms 400 and 450 are substantially identical. However, in another example embodiment, the optical connector latch arms 400 and 450 can be dissimilar and still function as described herein.

In one example embodiment, the optical connector latch arms 400 and 450 are each separate substantially monolithic components. Also, because of the configuration of the OSA connector block 200 and the EMI shield 226, the optical connector latch arms 400 and 450 can be formed entirely from a substantially non-conductive material, such as plastic, without risking the emission of significant electromagnetic radiation through the optical connector latch arms 400 and 450 or through the openings 216 and 218, as discussed in greater detail below.

The optical connector latch arm 400 includes a base 402, a shaft 404 extending from the base 402, and a hook 406, or other suitable engagement structure, extending from the shaft 404. In one example embodiment, the shaft 404 has a cantilever configuration with respect to the base 402, which enables the hook 406 to be configured to releasably engage an optical fiber connector (not shown). In the example embodiment disclosed in FIGS. 2A and 2B, the optical connector latch arm 450 includes a base 452, a shaft 454, and a hook 456 that are substantially identical to the base 402, shaft 404, and hook 406. In another example embodiment, the base 452, shaft 454, and hook 456 can be dissimilar to the base 402, shaft 404, and hook 406 and still function as described herein.

The optical connector latch arm 400 and the OSA connector block 200 may include respective complementary structures that can be configured to engage one another in order to facilitate the attachment of the optical connector latch arm 400 to the OSA connector block 200. Similarly, the optical connector latch arm 450 and the OSA connector block 200 may also include respective complementary structures that facilitate the attachment of the optical connector latch arm 450 to the OSA connector block 200.

For example, optical connector latch arm 400 may define a pair of tabs 408. The tabs 408 are configured to engage a corresponding pair of sockets 229 of the OSA connector block 200. Similarly, the optical connector latch arm 450 may define a pair of tabs 458 that are configured to engage a corresponding pair of sockets 231 of the OSA connector block 200. In one example embodiment, the sockets 229 and 231 of the OSA connector block 200 can be configured to slightly overlap the tabs 408 and 458, respectively. This slight overlap can enable the optical connector latch arms 400 and 450 to be attached to the OSA connector block 200 by, for example, snapping the optical connector latch arms 400 and 450 into place within the corresponding sockets 229 and 231 such that respective portions of the latch arms 400 and 450 extend through openings 216 and 218. Alternatively, the optical connector latch arms 400 and 450 can be attached to the OSA connector block 200 in a number of different ways including, but not limited to, using a through hole, pinning, swaging, press fitting, gluing, or screw fastening.

4. Example OSA Connector Assembly

With reference now to FIGS. 3A-4D, further aspects of an example OSA connector assembly 300 are disclosed. As disclosed in FIGS. 3A and 3B, the OSA connector assembly 300 generally includes the TOSA 118 and the OSA connector block 200, connected together with an adhesive 202. The adhesive 202 can be, for example, an epoxy such as a heat cure epoxy, although other suitable adhesives can alternatively be employed. The adhesive 202 can also be employed to fill in any gaps between the OSA 118 and the OSA connector block 200. As such, the adhesive 202 can conform to the size, shape, and volume of any gaps between the OSA 118 and the interior of the OSA connector block 200.

The example OSA connector assembly 300 disclosed in FIGS. 3A-4D also discloses the optical connector latch arms 400 and 450 situated in the openings 216 and 218, respectively. As disclosed in FIGS. 4B and 4D, once the optical connector latch arms 400 and 450 are situated in the openings 216 and 218, the hooks 406 and 456 are at least partially disposed in the receptacle 112. The hooks 406 and 456 are also situated and configured to releasably engage an optical fiber connector (not shown) that is received within the receptacle 112. As disclosed in FIG. 4D, the optical connector latch arms 400 and 450 can also be configured and situated to avoid making mechanical contact with each other.

Additional details regarding the structure and function of example embodiments of the OSA connector block 200 and 250 can be found in co-pending U.S. patent application Ser. No. 11/693,674, titled "OPTICAL SUBSASSEMLY CONNECTOR BLOCK FOR AN OPTOELECTRONIC MODULE," which is filed concurrently herewith and incorporated herein by reference in its entirety.

The example EMI shields 226 and 227 disclosed herein can help control the emission of EMI-causing electromagnetic radiation from the optoelectronic module 100. For example, the EMI shields 226 and 227 can form a portion of an electromagnetic radiation envelope or Faraday cage that reduces or eliminates the emission of electromagnetic radiation from one or more areas of the optoelectronic module 100.

In addition, the example EMI shields 226 and 227 disclosed herein also shield the OSA connector blocks 200 and 250, respectively, from electromagnetic radiation generated from within the optoelectronic module 100, which eliminates the need for the OSA connector blocks 200 and 250 to be configured and arranged to prevent the emission of electromagnetic radiation. The example EMI shields 226 and 227 thus enable, for example, portions of the OSA connector blocks 200 and 250, and/or components integrated into the OSA connector blocks 200 and 250, to be formed from a substantially non-conductive material, or to include openings in a conductive material, without the emission of detrimental electromagnetic radiation from the optoelectronic module 100. For example, the optical connector latch arms 400 and 450 can be formed from plastic or other substantially non-conductive material, and the body 204 of the OSA connector block 200 can include the openings 216 and 218, without risking the emission of significant electromagnetic radiation through the optical connector latch arms 400 and 450 or through the openings 216 and 218.

The example optical connector latch arms 400 and 450 disclosed herein can also interact independently with an optical fiber connector while avoiding any mechanical interaction or flexing between the optical connector latch arms 400 and 450.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical subassembly (OSA) connector block assembly comprising:
   an OSA connector block comprising:
      a monolithic body including:
         a first end defining a receptacle, the receptacle being configured to receive at least a portion of an optical fiber connector; and
         a second end defining a cavity, the cavity being configured to receive at least a portion of an OSA; and
   an optical connector latch assembly attached to the OSA connector block, the optical connector latch assembly comprising:
   two separate optical connector latch arms each comprising:
      a base attached to the monolithic body of the OSA connector block;
      a shaft extending from the base; and
      a hook extending from the shaft, the hook at least partially disposed in the receptacle, the hook configured to releasably engage an optical fiber connector.

2. The OSA connector block assembly as recited in claim 1, wherein:
   the monolithic body further includes two pairs of sockets; and
   each base further defines a pair of tabs engaged with one of the pairs of sockets.

3. The OSA connector block assembly as recited in claim 1, wherein the OSA connector block further defines a pair of openings in each of which at least a portion of one of the optical connector latch arms is situated.

4. The OSA connector block assembly as recited in claim 1, wherein the two separate optical connector latch arms are physically separated from each other.

5. The OSA connector block assembly as recited in claim 1, wherein each optical connector latch arm is a substantially monolithic component.

6. The OSA connector block assembly as recited in claim 1, wherein each optical connector latch arm is formed entirely from a non-conductive material.

7. The OSA connector block assembly as recited in claim 6, wherein the non-conductive material is plastic.

8. An optoelectronic module comprising:
   an electrically conductive housing;
   a transmitter OSA at least partially situated within the housing;
   a receiver OSA at least partially situated within the housing;
   a printed circuit board (PCB) at least partially situated within the housing, the PCB being in electrical communication with the transmitter OSA and the receiver OSA;
   a pair of OSA connector blocks at least partially situated within the housing, each OSA connector block corresponding to one of the OSAs, each OSA connector block comprising:
      a monolithic body including:
         a first end defining a receptacle, the receptacle being configured to receive at least a portion of an optical fiber connector; and
         a second end defining a cavity in which at least a portion of the corresponding OSA is situated; and
      an optical connector latch assembly attached to each OSA connector block, each optical connector latch assembly comprising:
      two separate optical connector latch arms each comprising:
         a base attached to the monolithic body of the OSA connector block;
         a shaft extending from the base;
         a hook extending from the shaft, the hook at least partially disposed in the receptacle, the hook configured to releasably engage an optical fiber connector.

9. The optoelectronic module as recited in claim 8, further comprising a pair of EMI shields each attached to one of the OSA connector blocks, each electromagnetic interference (EMI) shield being in electrical communication with the housing.

10. The optoelectronic module as recited in claim 8, wherein:
    each monolithic body further includes two pairs of sockets; and
    each base further defines a pair of tabs engaged with one of the pairs of sockets.

11. The optoelectronic module as recited in claim 8, wherein each OSA connector block further defines a pair of openings in each of which at least a portion of one of the optical connector latch arms is situated.

12. The optoelectronic module as recited in claim 8, wherein the two separate optical connector latch arms corresponding to each OSA connector block are physically separated from each other.

13. The optoelectronic module as recited in claim 8, wherein the optoelectronic module substantially conforms to the X2 Multi-Source Agreement.

* * * * *